United States Patent
Burch et al.

(10) Patent No.: US 10,701,864 B2
(45) Date of Patent: Jul. 7, 2020

(54) HARVESTER HAVING A FEED ROLLER DRIVEN BY A HYDRAULIC MOTOR

(71) Applicant: DEERE & COMPANY, Moline, IL (US)

(72) Inventors: Guy Burch, Thibodaux, LA (US); Emmett J. Hummel, IV, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 254 days.

(21) Appl. No.: 15/883,469

(22) Filed: Jan. 30, 2018

(65) Prior Publication Data

US 2019/0230861 A1    Aug. 1, 2019

(51) Int. Cl.
  *A01D 61/00* (2006.01)
  *A01D 51/00* (2006.01)
  *A01D 45/10* (2006.01)

(52) U.S. Cl.
  CPC ........... *A01D 61/006* (2013.01); *A01D 45/10* (2013.01); *A01D 51/00* (2013.01)

(58) Field of Classification Search
  CPC ..... F16H 2025/2075; F16H 2025/2062; F16H 2025/2078; A01D 61/006; A01D 45/10; A01D 51/00; H02K 7/083; G05B 2219/45003; B02C 18/06; B02C 18/24
  See application file for complete search history.

(56) References Cited

U.S. PATENT DOCUMENTS

| | | | |
|---|---|---|---|
| 4,897,986 A | | 2/1990 | Baker et al. |
| 6,076,340 A | * | 6/2000 | Fowler ................... A01D 45/10 56/13.3 |
| 8,230,669 B2 | | 7/2012 | Hinds |
| 9,520,756 B2 | * | 12/2016 | Fedosovsky ........ F16H 57/0497 |
| 9,788,485 B2 | * | 10/2017 | Craig ................. A01D 41/1271 |
| 10,194,589 B2 | * | 2/2019 | Almeida ................ A01D 45/10 |
| 10,292,329 B2 | * | 5/2019 | Almeida ................ A01D 45/10 |
| 2010/0307121 A1 | * | 12/2010 | Marchini ............... A01D 75/28 56/63 |
| 2015/0327437 A1 | * | 11/2015 | Mixon ................... A01D 45/10 56/16.4 C |
| 2015/0331408 A1 | | 11/2015 | Richard |
| 2018/0160626 A1 | * | 6/2018 | Burch ................. A01D 61/008 |

* cited by examiner

Primary Examiner — Arpad Fabian-Kovacs
(74) Attorney, Agent, or Firm — Taft Stettinius & Hollister LLP; Stephen F. Rost (57) ABSTRACT

A sugarcane harvester including a base cutter configured to cut sugarcane from a field and a feed roller chassis, disposed adjacently to the base cutter, configured to receive the cut sugarcane. A plurality of feed roller assemblies are supported by the feed roller chassis, wherein each of the plurality of feed roller assemblies includes a roller body defining a roller body cavity, a motor support located within the roller body cavity, the motor support defining a support cavity, and a bearingless hydraulic motor disposed within the support cavity. The bearingless hydraulic motor includes a spindle extending from the motor and through the support cavity. A spindle adapter is releasably coupled to the spindle and fixedly coupled to the roller body. A roller bearing, disposed within the support cavity, includes an inner surface in contact with the spindle adapter, wherein rotation of the spindle rotates the roller body while the bearingless motor remains stationary with respect to the motor support.

20 Claims, 5 Drawing Sheets

HARVESTER HAVING A FEED ROLLER DRIVEN BY A HYDRAULIC MOTOR

FIELD OF THE DISCLOSURE

The present invention generally relates to a harvesting machine, and more particularly to a system and method for driving the feed rollers of a sugarcane harvesting machine.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

Harvesters of various configurations, including sugarcane harvesters, have harvesting systems of various types. Harvesting systems for a sugarcane harvester, for example, include assemblies or devices for cutting, chopping, sorting, transporting, and otherwise gathering and processing sugarcane plants. Typical harvesting assemblies, in different embodiments, include a base cutter assembly (or "base cutter"), feed rollers, and cutting drums.

To actively harvest crops, the sugarcane harvester gathers and processes material from rows of sugarcane plants. In the case of one type of sugarcane harvester, the gathered sugarcane stalks are cut into billets that move through a loading elevator to an elevator discharge, where the cut sugarcane stalks are expelled to a collector, such as the sugarcane wagon. Leaves, trash, and other debris are separated from the billets and ejected onto the field.

In various harvesters, harvesting assemblies are hydraulically powered by an engine-driven pump or electrically powered by a generator or other electrical power supply. The harvesting assemblies include rotating drums that move the cut stalks toward a chopper. The rotating drums are driven by a hydraulic motor or an electric motor that rotationally drives the roller to continuously move the billets to the wagon. The motors include splines that engage the roller to drive the roller about a rotation axis.

Debris, including dust and dirt, can collect in spaces located between metal parts that present several problems. For example, in case of the sugarcane harvester, debris tends to get accumulated in the spaces located at the ends of the feed rollers.

Feed rollers, and particularly the splines of the motor driving the feed roller, are exposed to the external environment and to the debris found there. The debris accumulates and often causes the splines driving the rollers to wear out. Depending on the configuration of the rollers and the motors driving the rollers, the accumulated debris may be removed during regular servicing to ensure that the feed rollers run smoothly, thereby avoiding increased load on motors which reduces bearing life. In addition, the feed rollers are made of metal and the accumulated debris causes metal corrosion, another undesirable effect of the accumulated debris. To reduce the effects of the accumulated debris, the harvester is stopped to clean out the debris, which reduces the time in which the harvester is productive.

What is needed therefore is a sugarcane harvester including a harvesting system having harvesting assemblies that are less susceptible to the damaging effects of the debris resulting from the harvesting of sugarcane.

SUMMARY

In one embodiment, there is provided a feed roller assembly for a sugarcane harvester including a roller body having a cylinder defining a cylinder cavity and a first support plate located with the cylinder cavity. A motor support is located within the cylinder cavity, wherein the motor support defines a support cavity. A bearingless motor is disposed within the support cavity and includes a spindle extending from the motor and through the support cavity. A spindle adapter is releasably coupled to the spindle and fixedly coupled to the first support plate. A roller bearing is disposed within the support cavity and includes an inner surface in contact with the spindle adapter, wherein rotation of the spindle rotates the roller body while the bearingless motor remains stationary with respect to the motor support.

In another embodiment, there is provided a sugarcane harvester including a base cutter configured to cut sugarcane from a field, a feed roller chassis disposed adjacently to the base cutter, configured to receive the cut sugarcane, and a plurality of feed roller assemblies supported by the feed roller chassis. Each of the plurality of feed roller assemblies includes a roller body defining a roller body cavity and a motor support located within the roller body cavity. The motor support defines a support cavity. A bearingless hydraulic motor is disposed within the support cavity, wherein the bearingless hydraulic motor includes a spindle extending from the motor and through the support cavity. A spindle adapter is releasably coupled to the spindle and fixedly coupled to the roller body. A roller bearing is disposed within the support cavity and an inner surface of the roller bearing is in contact with the spindle adapter, wherein rotation of the spindle rotates the roller body while the bearingless motor remains stationary with respect to the motor support.

In still another embodiment, there is provided a feed roller assembly for a sugarcane harvester including a roller body defining a roller body cavity and a motor support located within the roller body cavity, wherein the motor support defines a support cavity. A motor is disposed within the support cavity, wherein the motor includes a spindle extending from the motor and through the support cavity. A spindle adapter is releasably coupled to the spindle and fixedly coupled to the roller body. A roller bearing is disposed within the support cavity and includes an inner surface in contact with the spindle adapter. Rotation of the spindle rotates the roller body while the motor remains stationary with respect to the motor support.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
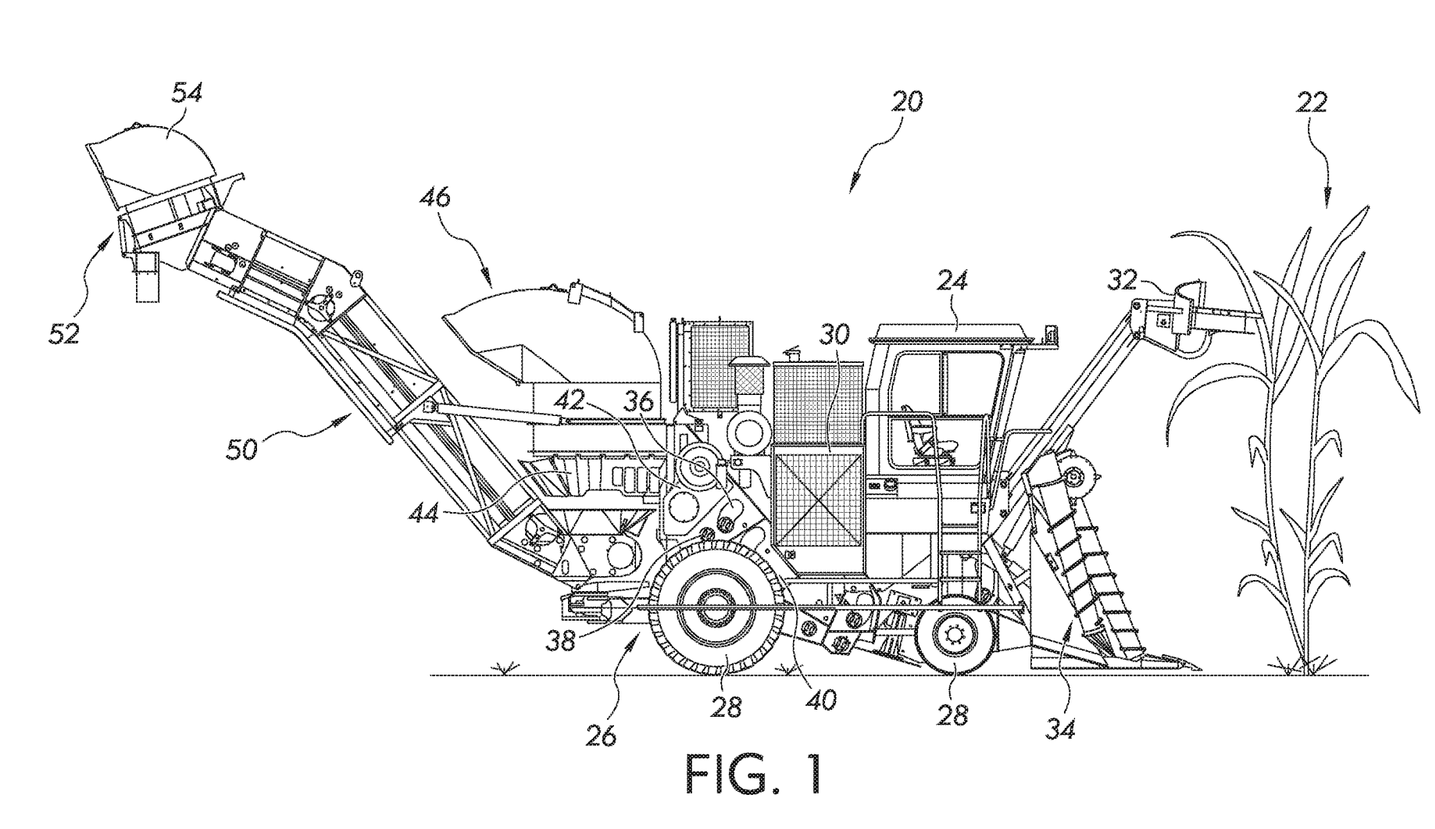
FIG. 1 is a side elevational view of a work vehicle, and more specifically, of an agricultural vehicle such as a sugarcane harvesting machine.

FIG. 1 illustrates a side view of a sugarcane harvester 20 adapted to cut sugarcane 22, with the front of the harvester 20 facing to the right. Accordingly, certain components of the harvester 20 may not be visible in FIG. 1. The harvester 20 includes a cab 24 located on a main frame 26 that is supported by wheels 28 configured to move the harvester along rows of sugarcane 22. An engine is located within a housing 30 that moves the wheels 28 along a field to continually cut the sugarcane 22 for harvesting. In different embodiments, the engine also powers various driven components of the harvester 20. In certain embodiments, the engine directly powers a one or more hydraulic pumps (not shown) and other driven components powered by the hydraulic motors via an embedded hydraulic system (not shown).

Figure 2:
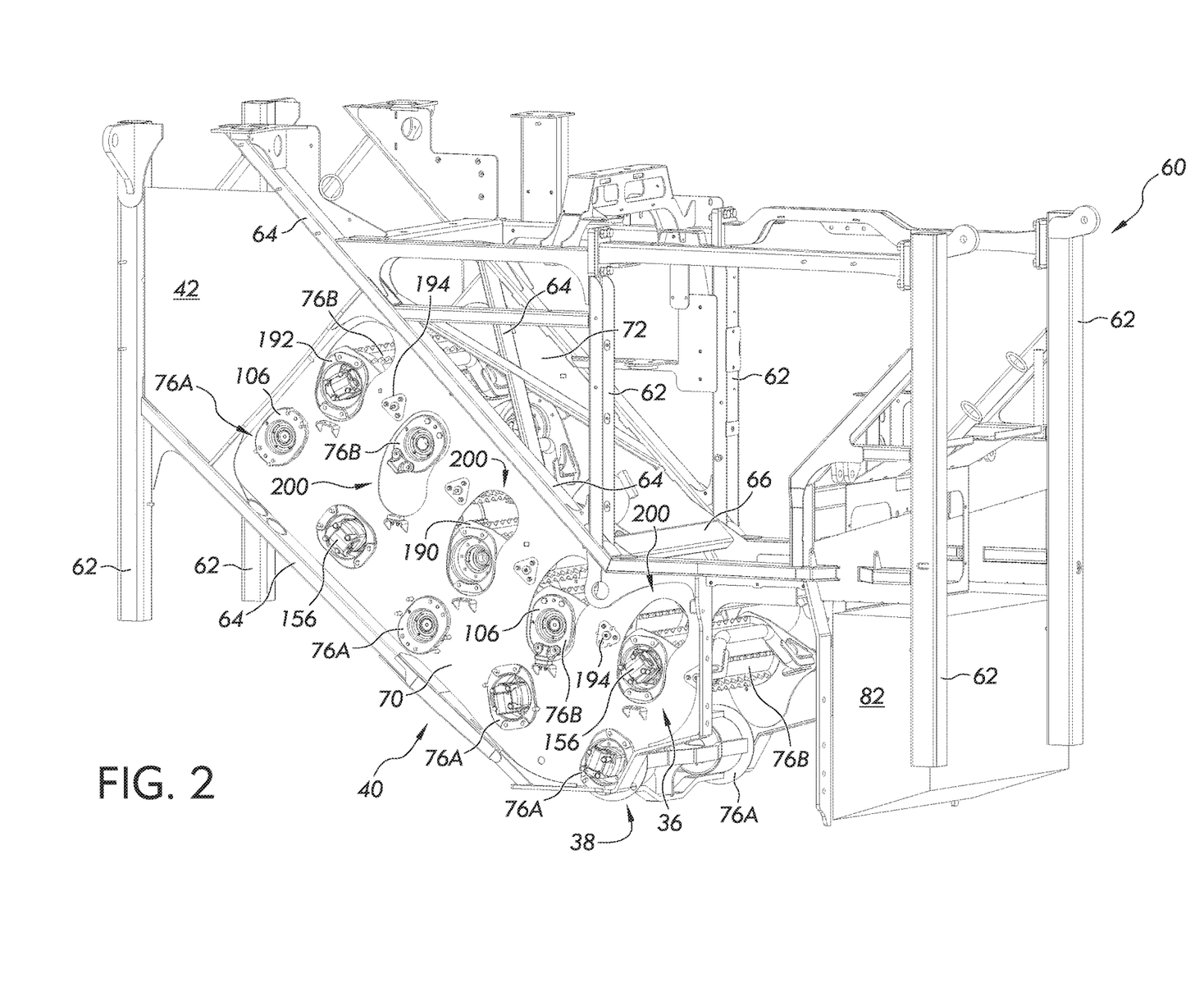
FIG. 2 is a partial perspective view of a feeder system of a sugarcane harvesting machine including a plurality of feed rollers.

A cane topper 32 extends forward of the frame 26 in order to remove the leafy tops of sugarcane plants 22 and a set of crop dividers 34 guides the stalks of sugarcane toward internal mechanisms of the harvester 20 for processing. As the harvester 20 moves across a field, sugarcane plants passing between the crop dividers 34 are deflected downward by one or more knockdown rollers before being cut near the base of the plants 22 by a base cutter assembly as would be understood by one skilled in the art. Rotating disks, guides, or paddles (not shown) on the base cutter assembly further direct the cut ends of the plants upwardly and rearward within the harvester 20 toward successive pairs of upper feed rollers 36 and lower feed rollers 38. The feed rollers 36 and 38 are supported by a feed roller chassis 40 which is supported by the main frame 26 as also illustrated in FIG. 2. The upper and lower feed rollers 36 and 38 convey the stalks toward a chopper drum module 42 for chopping the stalks into billets.

The chopper drum module 42 include upper and lower chopper drums that rotate in opposite directions in order to chop the moving stalks into billets, as would be understood by one skilled in the art. The billets are propelled into a cleaning chamber 44 that is located at the base of a primary extractor 46. The primary extractor 46, in different embodiments, includes a powered fan to extract trash and debris from the cleaning chamber 44. A loading elevator 50, with a one end located at the bottom of the cleaning zone 44, conveys the cleaned billets upward to a discharge location 52, below a secondary extractor 54, where the billets discharged into a truck, a wagon, a container, or other receptacle that collects the discharged billets.

FIG. 2 illustrates a frame portion 60 of the frame 26 configured to support the chassis 40. The frame portion 60 includes a plurality of upright frame members 62, a plurality of angled frame members 64, and a plurality of cross-frame members 66. The cross-frame members 66 extend between sides of the frame portion 60 to provide structurally rigidity and maintain spacing for supporting the chassis 40.

The chassis 40 includes a first side plate 70 and a second side plate 72, each of which is formed of a generally planar material, such as a sheet steel panel, that defines an interior space to accommodate a plurality of feed roller assemblies 76. The bottom row 38 of feed roller assemblies 76A extends from a right side, as illustrated, toward a left side. The top row 36 of feed roller assemblies 76 B likewise extends from the right side to the left side. Each of the bottom row 38 and the top row 36 are inclined with respect to ground.

The base cutter, the location of which is generally shown at 82, is located at the right side and feeds cut stalk into the chassis 40. The cut stalk moves between the bottom row 38 and the top row 36 of feed rollers on an inclined plane and into the chopper drum module 42, the location of which is generally shown.

Figure 3:
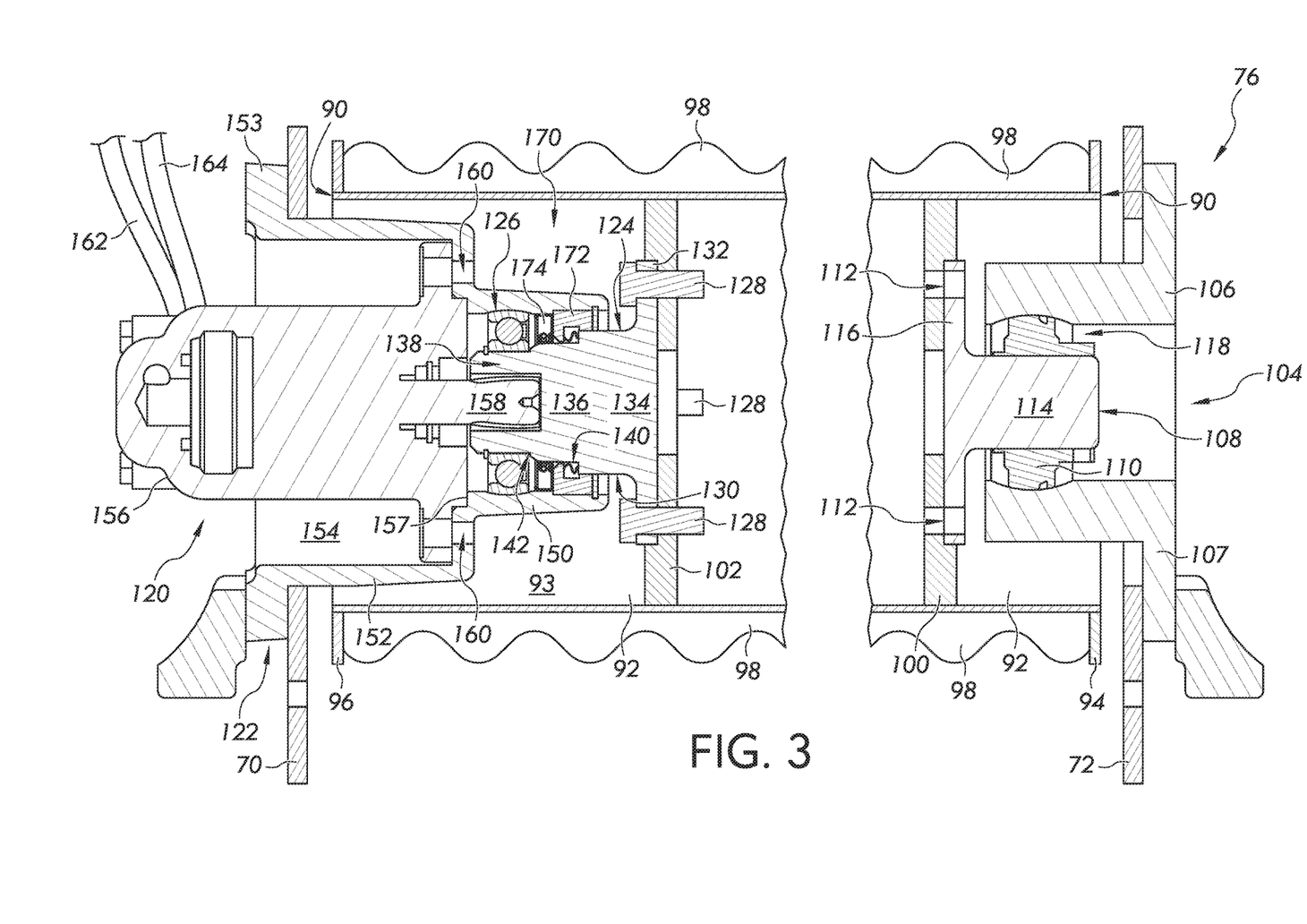
FIG. 3 is a cross-sectional view of one embodiment of a feed roller supported side plates of the feeder system.

FIG. 3 illustrates a cross-sectional side view of a feed roller assembly 76. The feed roller assembly 76 includes a roller body 90 which includes a cylinder 92, defining an interior 93, which extends between a first end 94 and a second end 96. A middle portion of the roller body 90 and the cylinder 92 are not shown. One or more sets of teeth 98 are coupled to the cylinder 92 and extend from the first end 94 to the second end 96. In one embodiment, there are eight sets of teeth 98 that are equidistantly spaced about the outer circumference of the cylinder 92. In other embodiments, different numbers of sets of teeth 98 are contemplated. In another embodiment, the feed roller assembly 76 does not include a cylinder extending between ends of the roller body. In this embodiment, ends of the roller body are coupled together by longitudinally extending support plates having sets of teeth. The support plates provide structural support for the ends and define four sets of teeth as opposed to the eight sets of teeth illustrated in FIG. 3.

A first cylinder plate 100 and a second cylinder plate 102 are located in the interior 93 and are fixedly coupled to an interior surface of the cylinder 92. The first and second cylinder plates 100 and 102 provide structural rigidity to the cylinder 92 as well as provide support locations for coupling the feed roller assembly to the side plates 70 and 72.

The first end 94 is rotationally supported by a first support assembly 104 which includes a roller support 106 including a flange or base 107, a mount 108 for the roller support 106, and a bearing 110. In one embodiment, the bearing 110 is a roller bearing including an inner ring and an outer ring as is understood by one skilled in the art. The mount 108 is fixedly coupled to the cylinder plate 100 with one or more connectors, not shown, which extend through apertures 112 of the cylinder plate 100 and apertures of a flange 116. The support 108 includes a generally cylindrical portion 114 extending from the flange 116 defining the apertures for fixedly connecting the mount 108 to the cylinder plate 100. The generally cylindrical portion 114 extends through the inner ring of the bearing 110 which is located within a chamber 118 defined by the roller support 106. An outer ring of the bearing 110 is fixed to an inside surface defined by the chamber 118. With this configuration, the bearing 110 provides independent rotational movement of the roller support 106 with the roller body 90.

A second support assembly 120 includes a motor support 122, a spline adapter 124, and a bearing 126. The spline adapter 124 is fixedly coupled to the cylinder plate 102 with one or more connectors 128, which extend through apertures of the cylinder plate 102 and apertures of the spline adapter 124. The spline adapter 124 includes a generally cylindrical portion 130 extending from a flange or base 132. The flange 132 is fixedly connected to the cylinder plate 102 with the connectors 128. The generally cylindrical portion 130 includes a first portion 134, a second portion 136, and a third portion 138. A first shoulder 140 is defined at a transition between the first portion 134 and the second portion 136. A second shoulder 142 is defined at a transition between the second portion 136 and the third portion 138.

The motor support 122 includes a first cylinder 150, a second cylinder 152 extending from the first cylinder 150, and a flange 153 operatively connected to the side plate 70. The first cylinder 150 defines a chamber configured to receive the generally cylindrical portion of the spline adapter 124 and the second cylinder 152 defines a chamber 154 configured to receive a hydraulic motor 156. The hydraulic motor 156 includes a spindle 158 that extends into and is fixedly coupled to a chamber in the third portion 138 of the spline adapter 124. While a hydraulic motor is described and illustrated, other types of motors are contemplated.

The hydraulic motor 156 is fixedly coupled to the motor support 122 at apertures 160 with connectors (not shown). An O-ring 157 is located between the motor 156 and the motor support 122 to maintain a fluid seal and to substantially prevent fluid leakage from the chamber defined between the motor 156 and the motor support 122. When the spindle 158 is rotationally driven by the hydraulic motor 156 in response to hydraulic fluid directed through fluid lines 162 and 164, the spline adapter 124 rotates responsively. The bearing 126 enables rotation of the spline adapter 124, which rotates the roller body 90. Since the spline adapter 124 is coupled to the cylinder plate 102, the roller body 90 rotates in response. Roller body 90 rotation is supported at the first end 94 by the first support assembly 104 as described above.

When the feed roller assemblies 76 are configured as feed roller assemblies 76A, the roller support 106 is fixedly coupled to one of the side plates 70 or 72 and the roller support 120 is fixedly coupled to the other of the side plates 70 or 72. As seen in FIG. 3, the side plates 70 and 72 have been identified for purposes of illustration, however in different embodiments, the location of roller assembly 76A within the side plates 70 and 72 is reversed.

Because the motor 156 is fixedly coupled to the motor support 122 and the motor support 122 is fixedly coupled to one of the side plates 70 or 72, rotation of the spindle 158 causes rotation of the spline adapter 124 which is rotationally supported within the motor support by the bearing 126.

A chamber 170 is defined within the cylinder 92 between the inner surface of the cylinder 92 and the outer s of the motor support 122 and the spline adapter 124. This chamber 170 is often called "the bird's nest" since the different types of debris tend to collect there due to the nature of sugarcane harvesting. Such debris, including plant material, soil, and grasses, if allowed to accumulate, can damage the motor 156 if not adequately protected.

"Bearingless" hydraulic motors, as described herein, do not have a seal that protects the inside of the motor from debris. The motor oil exits from and returns to the motor in the area of the spindle 158. Consequently, the hydraulic oil lubricates the bearing 126 and the spindle 158 in addition to the motor. In the illustrated embodiment, a radial lip seal 174 holds the hydraulic oil in the chamber and in the motor and protects the inside of the chamber, the inside of the motor, the bearing 126 and the spindle 158 from debris. The spindle 158 includes curved external splines that engage internal splines of the third portion 138. The curved external splines accommodate the angular displacement of the spindle 158 about a longitudinal axis of the motor resulting from the movement of the internal gear within the bearingless motor.

Figure 4:
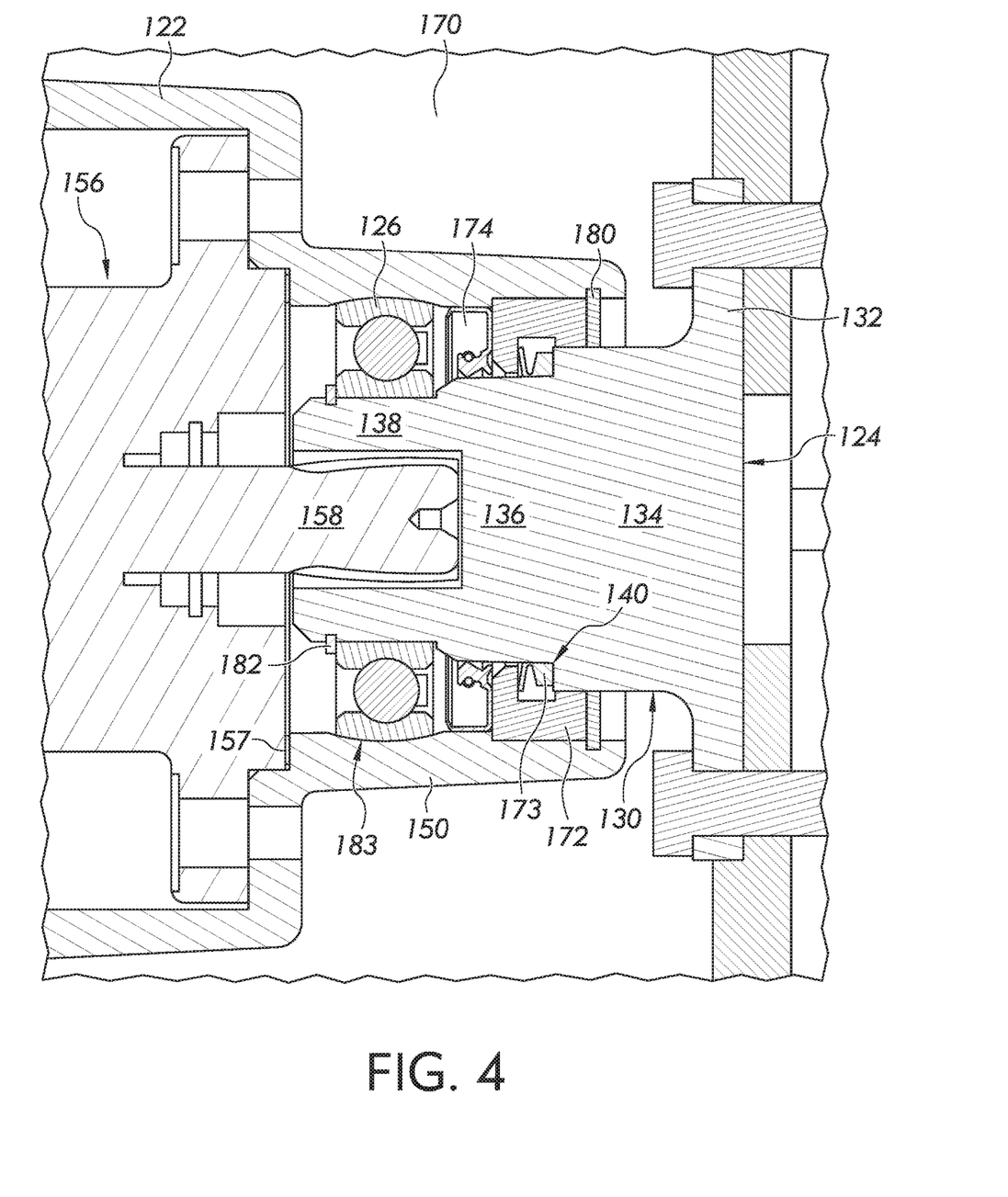
FIG. 4 is a partial sectional cross-sectional view of a feed roller.

To provide additional protection against the elements and debris as seen in FIG. 4, a seal 172 provides mechanical retention for the radial lip seal 174. Secondarily, the seal 172 substantially prevents small particles from entering into the space accommodating the bearing 126 and the spindle 158. In one embodiment, the seal 172 is made of steel. In other embodiments, the seal is made of another type of rigid material configured to retain the radial lip seal 174. The seal 172 is located about the generally cylindrical portion 130 at the transition between the first portion 134 and the second portion 136. The seal 172 defines a space between the seal 172 and the spline adapter 124 which is sized to accommodate a v-ring seal 173. In one embodiment, the V-ring seal 173 is located adjacent to the first shoulder 140. A radial lip seal 174 is located between the seal 172 and the bearing 126. The radial lip seal 174 is located about the second portion 136 and has one side thereof located at the transition between the second portion 136 and the third portion 138. Each of the seal 172, the v-ring seal 173, and the radial lip seal 174 are configured to seal the interface between the spline adapter 124 and the interior of the motor support 122. The radial lip seal 172 keeps debris from entering into the chamber defined between the motor 156 and the motor support 122 as well as to keep the hydraulic oil in the same chamber. The seal keep the hydraulic oil clean and the area around the bearings and spindle free from debris.

Debris entering the chamber 170 is substantially prevented from entering into the cavity of the first cylinder 150. With this configuration, the bearing 126 is kept relatively clean of debris which prolongs the life of the bearings 126 and consequently the feed roller apparatus 76.

To maintain the position of the seal 172, a snap ring 180 is located about the first portion 134 adjacent to seal 172. The snap ring 180 engages a slot formed in the interior surface of the first cylinder 150. Another snap ring 182 is located about the third portion 138 adjacent to the bearing 126. The bearing 126 is held in place by a spherical cut out/bore 183 in the first cylinder 150. The spherical cut out/bore 183 matches the spherical outer diameter of the bearing 126. The snap ring 182 holds the spline adapter 124. The hydraulic oil in the cavity around the bearing 126 is slightly pressurized due to the motor case pressure. This pressure tends to push the spline adapter 124 out of the cavity. The snap ring 182 prevents the spline adapter 124 from being pushed out of the cavity. Similarly, the snap ring 180 acts as a secondary retention for the radial lip seal 174 from being pushed out through the retainer/seal 172.

Figure 5:
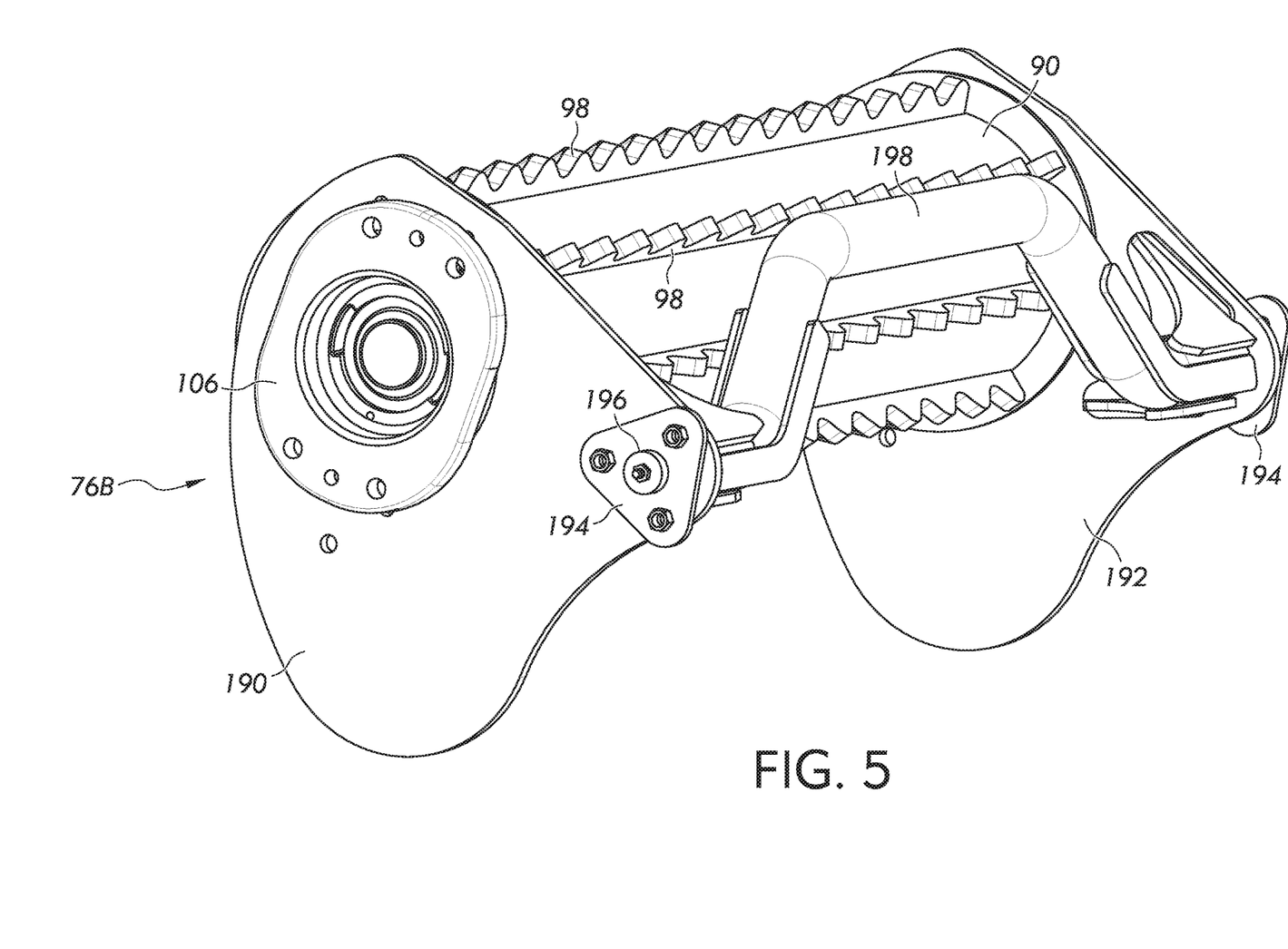
FIG. 5 is a sectional view of another embodiment of a feed roller system.

FIG. 5 illustrates one of the feed roller assemblies 76B as shown in FIG. 3. In this embodiment, the assembly 76B is rotatably fixed to the first side plate 70 and to the second side plate 72 with a first cradle plate 190 and a second cradle plate 192. Each of the cradle plates 190 and 192 are fixedly coupled to one of the motor support 122 or the roller support 106 of FIG. 3. The cradle plates 190 and 192 are located between the first side plate 70 and the second slide plate 72. A support plate 194 is bolted to the mainframe walls 70 and 72 (as seen in FIG. 2). Support plate 194 and a pin 196 are a welded assembly. The pin 196 extends through the support plate 194, and extends into a support arm 198. The pin 196 has no movement relative to mainframe walls 70 and 72. Support arm 198 has bores to receive the pin 196 to provide for relative motion between the cradle plates 190 and 192 and the mainframe walls 70 and 72. The support arm 198 extends from the first cradle plate 190 to the second cradle plate 192 and provides structural support for the feed roller assemblies 76B.

The roller assemblies 76B rotate relatively freely about a rotational axis defined by the pins 196 such that movement of the roller assemblies 76 make an arcuate path within holes 200 which are located in the side plates 70 and 72. The holes 200 are "bean shaped" such that the roller assemblies 76 travel an arcuate path defined by the locations of the pins 196. As the stalks of the sugarcane moves between the rollers 76A and 76B, the rollers 76B move up and down depending on the number of stalks moving through the chassis 40.

As seen in FIG. 2, the some of the ends of each of the assemblies 76A and 76B are alternated at certain position when located in the side panels 70 and 72, such that the end having the motor 156 extends through the hole 200 at one location and the end having the roller support 106 extends through an adjacent hole 200. This alternation of motors 156 and roller supports 106 reduces the complexity of attaching fluid lines 162 and 164 to the motors 156. The holes through which the motors 156 and rollers supports 106 extend through sides 70 and 72 for assemblies 76A are configured to fix the position of the assemblies 76A during movement of the cut stalks of sugarcane. In this fashion, only the top row 36 of assemblies 76B moves along the plane of the sides 70 and 72 during the transport of the stalk from being cut at the ground to being cut to billets at the chopper drum module 42. Each of the assemblies 76A and 76B, however, is rotationally driven by the motors 156.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A feed roller assembly for a sugarcane harvester comprising:
   a roller body including a cylinder defining a cylinder cavity, and a first support plate located with the cylinder cavity;
   a motor support located within the cylinder cavity, the motor support defining a support cavity;
   a bearingless motor disposed within the support cavity, the bearingless motor including a spindle extending from the motor and through the support cavity, wherein the bearingless motor is driven in response to and lubricated by a hydraulic fluid;
   a spindle adapter releasably coupled to the spindle and fixedly coupled to the first support plate, the spindle adapter including a chamber in which the spindle is located; and
   a roller bearing disposed within the support cavity, the roller bearing having an inner surface in contact with the spindle adapter, wherein rotation of the spindle rotates the roller body while the bearingless motor remains stationary with respect to the motor support, wherein the hydraulic fluid is located in the support cavity and the chamber to lubricate the roller bearing and the spindle.

2. The feed roller assembly of claim 1 wherein the cavity of the motor support includes a first portion and a second portion, wherein the spindle extends from the motor to the second portion.

3. The feed roller assembly of claim 2 wherein the roller bearing is disposed in the second portion and the spindle and the spindle adapter are disposed within the roller bearing.

4. The feed roller assembly of claim 3 further comprising a sealing ring disposed within the second portion and around the spindle adapter, wherein the sealing ring provides a seal between the spindle adapter and the second portion of the support.

5. The feed roller assembly of claim 4 wherein the motor support defines a debris cavity, wherein the debris cavity is a portion of the cylinder cavity, and the seal provided by the sealing ring substantially prevents contaminants from entering the second portion of the support cavity.

6. The feed roller assembly of claim 5 further comprising a snap ring disposed adjacently to the sealing ring.

7. The feed roller assembly of claim 6 further comprising a radial lip seal disposed between the sealing ring and the roller bearing.

8. The feed roller assembly of claim 1 further comprising a second support plate located within the cylinder cavity, a roller support extending into the cylinder cavity, a bearing disposed within the roller support, a mount disposed within the bearing and fixedly coupled to the second support plate.

9. The feed roller assembly of claim 8 wherein the motor support includes a flange adapted to be fixed to one of a frame side plate or a cradle support, and the roller support includes a flange adapted to be fixed, to one of a frame side plate or a cradle support.

10. A sugarcane harvester comprising:
    a base cutter configured to cut sugarcane from a field;
    a feed roller chassis, disposed adjacently to the base cutter, configured to receive the cut sugarcane;
    a plurality of feed roller assemblies supported by the feed roller chassis, each of the plurality of feed roller assemblies including a roller body defining a roller body cavity, a motor support located within the roller body cavity, the motor support defining a support cavity, a bearingless hydraulic motor disposed within the support cavity and driven by a hydraulic fluid, the bearingless hydraulic motor including a spindle extending from the motor and through the support cavity, a spindle adapter including a chamber, wherein the spindle adapter is releasably coupled to the spindle and fixedly coupled to the roller body, and a roller bearing disposed within the support cavity, the roller bearing having an inner surface in contact with the spindle adapter, wherein rotation of the spindle rotates the roller body while the bearingless motor remains stationary with respect to the motor support and the hydraulic fluid is located, in the support cavity and the chamber to lubricate the roller bearing and the spindle.

11. The sugarcane harvester of claim 10 wherein the cavity of the motor support includes a first portion and a second portion, wherein the spindle extends from the motor to the second portion.

12. The sugarcane harvester of claim 11 wherein the roller bearing is disposed in the second portion and the spindle adapter is disposed within the roller bearing.

13. The sugarcane harvester of claim 12 further comprising a sealing ring disposed within the second portion and around the spindle adapter, wherein the sealing ring provides a seal between the spindle adapter and the second portion of the support.

14. The sugarcane harvester of claim 12 wherein the motor support defines a debris cavity, wherein the debris cavity is a portion of the cylinder cavity, and the seal provided by the sealing ring substantially prevents contaminants from entering the second portion of the support cavity.

15. The sugarcane harvester of claim 14 further comprising a snap ring disposed adjacently to the sealing ring.

16. The sugarcane harvester of claim 15 further comprising a radial lip seal disposed between the sealing ring and the roller bearing.

17. The sugarcane harvester of claim 10 further comprising a roller support extending into the roller body cavity, a bearing disposed within the roller support, and a mount disposed within the bearing and coupled to the roller body.

18. The sugarcane harvester of claim 17 wherein the motor support includes a flange adapted to be fixed to one of a first frame side or a first cradle support, and the roller support includes a flange adapted to be fixed to one of the first frame side or a second cradle support.

19. A teed roller assembly for a sugarcane harvester comprising:
   a roller body defining a roller body cavity;
   a motor support located within the roller body cavity, the motor support defining a support cavity;
   a motor disposed within the support cavity, the motor being driven by a hydraulic fluid and including a spindle extending from the motor and through the support cavity;
   a spindle adapter including a chamber, wherein the spindle adapter is releasably coupled to the spindle and fixedly coupled to the roller body; and
   a roller bearing disposed within the support cavity, the roller bearing having an inner surface in contact with the spindle adapter, wherein rotation of the spindle rotates the roller body while the motor remains stationary with respect to the motor support and the hydraulic fluid is located in the support cavity and the chamber to lubricate the roller bearing and the spindle.

20. The feed roller assembly of claim 19 further comprising a roller support extending into the roller body cavity, a bearing disposed within the roller support, and a mount disposed within the bearing and coupled to the roller body, wherein the motor support rotatably supports the roller body at a first end and the roller support rotatably supports the roller body at a second end.

* * * * *